United States Patent [19]
Hull et al.

[11] Patent Number: 5,018,651
[45] Date of Patent: May 28, 1991

[54] SIDE OR END DUMP ARTICLE CARRIER

[76] Inventors: Harold L. Hull, 401 Canyon Way, Sp. 43, Sparks, Nev. 89434; Albert B. Currey, Rte. I, Box 185, Eucha, Okla. 74342

[21] Appl. No.: 290,747

[22] Filed: Dec. 27, 1988

[51] Int. Cl.⁵ .................................................. B60R 9/06
[52] U.S. Cl. ................................. 224/42.44; 414/462; 298/17.7; 224/280; 224/281; 224/282; 224/42.08; 280/769
[58] Field of Search ................ 224/42.07, 42.08, 42.43, 224/42.44, 280, 281, 282, 42.03 R, 42.45 R; 280/638, 769; 414/469, 470, 477, 474, 476, 480, 484, 485, 462; 298/17.7, 17.6

[56] References Cited

U.S. PATENT DOCUMENTS

| | | | |
|---|---|---|---|
| 3,103,290 | 9/1963 | Perri | 224/42.08 |
| 3,687,318 | 8/1972 | Casey et al. | 414/462 |
| 3,720,336 | 3/1973 | Murray et al. | 414/470 |
| 4,646,952 | 3/1987 | Timmers | 224/42.07 |
| 4,744,590 | 5/1988 | Chesney | 224/42.08 |
| 4,813,584 | 3/1989 | Wiley | 224/42.44 |
| 4,815,638 | 3/1989 | Hutyra | 224/42.07 |

FOREIGN PATENT DOCUMENTS 1183800 12/1964 Fed. Rep. of Germany ..... 298/17.6

Primary Examiner—Henry J. Recla
Assistant Examiner—Glen T. Barrett

[57] ABSTRACT

A load carrying apparatus that attaches to the existing square tube trailer hitch or receiver of a vehicle which does not need to be affixed to the towing vehicle by its bumper and which may also have an affixable swivel wheel, loading ramps, and tie downs to tie down a load and which may be used as a tilting or dumping device which may be tilted or dumped to either side or the rear.

4 Claims, 1 Drawing Sheet

SIDE OR END DUMP ARTICLE CARRIER

TECHNICAL FIELD

This invention relates to a load carrying apparatus that attaches to the existing square tube trailer hitch or receiver of a vehicle and more particularly to a load carrying apparatus that can dump to the side or end of the carrier.

BACKGROUND ART

There are a number of package and article carrying devises described in prior art, some of which use the tubular receiver on the rear of a vehicle as a means to mount and secure said carrying devises, such as the article carrier of Dequevara in U.S. Pat. No. 4,676,414.

Exemplary of other prior art carriers which are removably interconnected with the bumpers of vehicles or the like are those devises illustrated and described in U.S. Pat. No. 3,877,622 issued to McLain and U.S. Pat. No. 4,299,341 issued to Copeland et al. The patent to Jordening U.S. Pat. No. 4,437,549 discloses a prior art devise for carrying bicycles or wheel chairs, while U.S. Pat. No. 4,771,439 teaches a luggage carrier apparatus for a vehicle which attaches to the rear bumper. Also, the present inventors have on file a patent pending, application No. 07/223,903 which defines an article carrier which uses the square tube receiver as a mounting means. None of the prior art teaches an article carrying apparatus that is attached by the tubular receiver and which allows the carrier to dump or tilt its load to the side or rear.

OBJECTS AND ADVANTAGES

The present invention relates to a carrier devise that overcomes the drawbacks of prior art carrier devises by providing an apparatus which is rugged yet light weight, which is highly stable and which can be easily interconnected with a standard tubular slider trailer hitch receiver, and which allows the load to be dumped or tilted to the side or rear of the apparatus.

It is an object of the invention to provide an apparatus which is easily interconnected to the standard tubular trailer receiver which does not require the use of special tools.

It is a further purpose to provide a storage and/or carrying space that is easily accessible and removable.

It is an additional purpose to provide a carrying devise that can be tilted or dumped to the side or rear.

Still another purpose is to provide an apparatus which can provide ramps which may be used for loading and unloading wheeled vehicles, such as motorcycles, bicycles, wheel chairs, power lawn mowers, 3 or 4 wheel off-road vehicles and/or any other devices that are cumbersome to load or unload.

Yet another purpose is to provide an attachable swivel wheel which may be used at will, to carry any accessive load.

Further objects and advantages will be apparent when considered in connection with the following specifications and drawings.

DETAILED DESCRIPTION OF THE DRAWINGS

Figure 1:
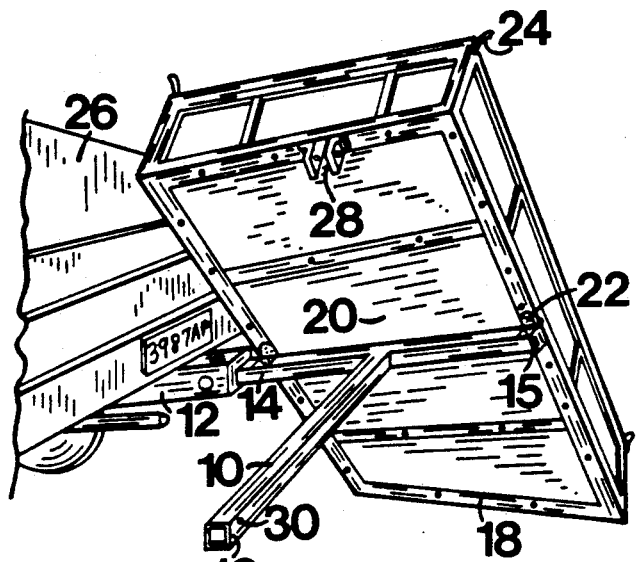
FIG. 1 is a perspective view of the carrier attached to a vehicle and shown dumping to one side.
Figure 2:
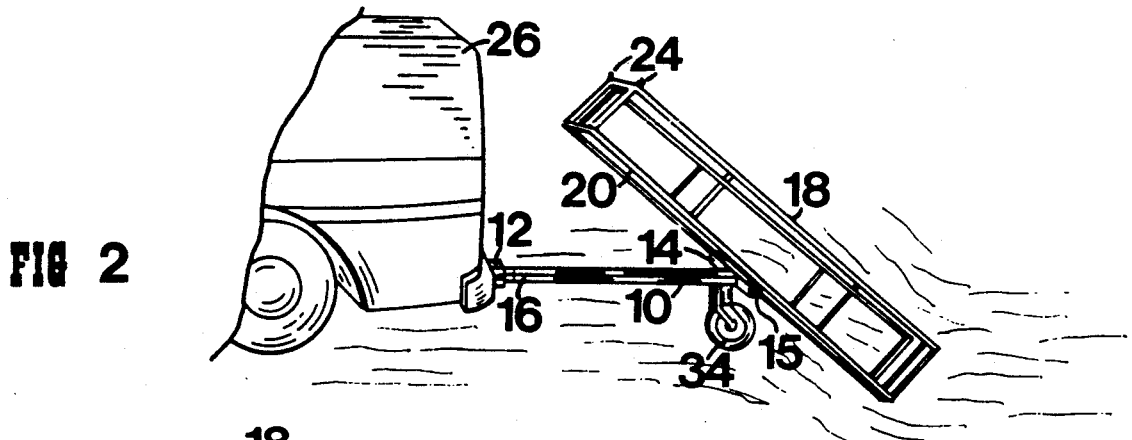
FIG. 2 is a perspective view of the carrier attached to a vehicle and shown dumping to the rear.
Figure 3:
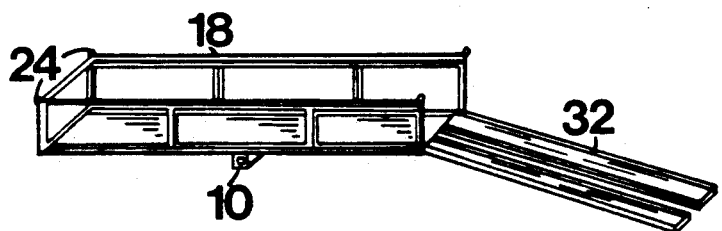
FIG. 3 is a perspective view of the carrier with loading ramps in place.
Figure 4:
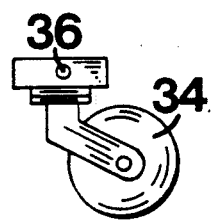
FIG. 4 is a side view of a swivel wheel.
Figure 5:
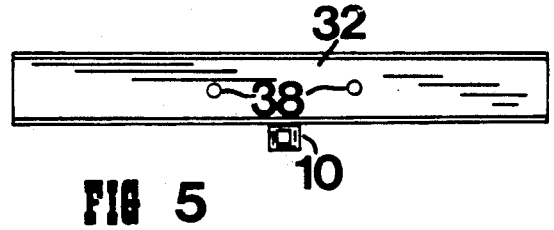
FIG. 5 is a top view of one of the loading ramps showing mounting means to attach to the side of the carrier.

Referring now to the drawings, wherein like reference numerals designate identical or corresponding parts throughout the several views, 10 is a support beam in the form of a T bar while 14, 15 and 16 are ends of the support beam T bar which any one of them may slide into the tubular receiver 12 which is mounted on vehicle 26, while 18 is a frame welded together and made of suitable material such as tubular steel or angle iron and 20 is the floor of the carrier made of suitable material such as plyboard and 22 are hinges, hinging frame 18 to main support beam 10, while 24 are tie-down hooks on the four corners of the frame 18 and 28 is a latching means that bolts frame 18 to support beam when carrier is not in a dumping position, while 30 is a bolt hole for a bolt to secure frame 18 through the latching means 28 to the main support frame 10, while 32 are loading ramps and 34 is an attachable swivel wheel, 36 being the mounting hole for wheel 34 which may be mounted in several places on support beam 10 at will, while 38 are mounting holes to allow means to bolt the ramps 32 to the side of frame 18 when not in use for loading or unloading.

SUMMARY OF THE INVENTION

It will now be seen that we have provided a simple and economical carrier devise that may be used with any vehicle which is equipped with a conventional tubular receiver and depending on which leg of the support beam 10, that is, ends 14, 15 or 16, is used in the tubular receiver 12 we can cause the carrier to dump to the side or to the rear of the vehicle.

We have also provided means to load or unload a wheeled vehicle such as a power lawn mower or a 3 or 4 wheel offroad vehicle or the like, by using the ramps 32 without using the dump feature if so desired.

We have also provided a storage and/or carrying space that is easily accessible and removable.

We have also provided an attachable swivel wheel which may or may not be used as desired and may be affixed to the main support beam 10 at any of a number of places.

Although the invention has been herein shown and described in what is conceived to be the most practical and preferred embodiments, it is recognized that departures may be made therefrom within the scope of the invention, which is not to be limited to the details disclosed herein but it is to be accorded the full scope of the claims so as to embrace any and all equivalent devices and apparatus.

Having described our invention, what we claim as new and desire to secure by letters patent is:

1. An article carrier adapted to be detachably interconnected with a standard tubular trailer hitch affixed to a frame of a towing vehicle comprising;
    (a) a connection member adapted to be removably interconnected with the trailer hitch, said connection member being in the form of a "T" so that any one of its three ends may be used as a point of connection with the vehicle tubular hitch;

(b) a carrier member adapted to be removably interconnected with the connection member and (c) means to pivotably attach said carrier member to said connection member.

2. The article carrier of claim 1 in which the carrier member has a first floor structure, a front wall structure, a rear wall structure and sidewall structures interconnecting the front and rear walls together.

3. The article carrier of claim 2 in which the carrier member has an additional, separate, second floor structure and means to attach one end of said second floor structure to said first floor structure whereby the other end of said second floor structure is supported by a driving surface, thus providing an angle of assent from the driving surface to the said first floor structure.

4. The article carrier of claim 1 in which the carrier member has tie down means to tie down a load.

* * * * *